(12) United States Patent
Nelson et al.

(10) Patent No.: US 9,613,455 B1
(45) Date of Patent: Apr. 4, 2017

(54) LOCAL GEOREFERENCED DATA (71) Applicant: Google Inc., Mountain View, CA (US)

(72) Inventors: Torsten Paul Nelson, Minas Gerais (BR); Eduardo Alves Ferreira, Minas Gerais (BR); Rodrigo Eduardo Lazo Paz, Minas Gerais (BR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/703,042

(22) Filed: May 4, 2015

Related U.S. Application Data (60) Provisional application No. 62/074,079, filed on Nov. 2, 2014.

(51) Int. Cl.
| | |
|---|---|
| *G06K 9/46* | (2006.01) |
| *G06K 9/66* | (2006.01) |
| *G06T 17/05* | (2011.01) |
| *G06K 9/00* | (2006.01) |
| *G06T 5/50* | (2006.01) |
| *G06T 19/20* | (2011.01) |

(52) U.S. Cl.
CPC .......... *G06T 17/05* (2013.01); *G06K 9/00671* (2013.01); *G06T 5/50* (2013.01); *G06T 19/20* (2013.01); *G06T 2200/04* (2013.01)

(58) Field of Classification Search
CPC ........... G06T 17/05; G06T 5/50; G06T 19/20; G06K 9/00671
See application file for complete search history.

(56) References Cited

U.S. PATENT DOCUMENTS

| | | | | |
|---|---|---|---|---|
| 8,326,048 B2* | 12/2012 | Ofek | .................... | G06K 9/3233 345/468 |
| 8,411,953 B2* | 4/2013 | Deluca | ............... | G06K 9/00664 382/181 |
| 8,487,957 B1* | 7/2013 | Bailly | ............... | G06F 17/30241 345/619 |
| 8,880,535 B1* | 11/2014 | Agarwal | ........... | G06F 17/30265 707/748 |
| 2013/0279760 A1* | 10/2013 | Lee | .......................... | G01S 5/16 382/106 |
| 2015/0373085 A1* | 12/2015 | Wang | ................ | G06F 17/30058 709/204 |

\* cited by examiner

*Primary Examiner* — David F Dunphy
(74) *Attorney, Agent, or Firm* — IP Spring (57) ABSTRACT

Methods, systems and computer readable media for identifying local georeferenced data are described. A method can include receiving a plurality of images and corresponding metadata for each image, the metadata including location information indicating where the corresponding image was acquired and object information indicating one or more objects shown in the corresponding image. The method can also include determining based on the images and corresponding metadata, that a group of images within the plurality of images is associated with a given object at a given location. The method can further include updating a digital map to include a cartographical feature based on the determination of the given object at the given location, wherein the cartographical feature is caused to be displayed on the digital map at a location corresponding to the given location.

22 Claims, 8 Drawing Sheets

LOCAL GEOREFERENCED DATA

RELATED APPLICATIONS

This application claims the benefit of U.S. Provisional Application No. 62/074,079, entitled "Local Georeferenced Data", and filed on Nov. 2, 2014, which is incorporated herein by reference in its entirety.

BACKGROUND

Digital maps in various forms have become popular with computer users and mobile device users. Digital maps typically show features such as roads, buildings, and geographic features (e.g., rivers, lakes, mountains and the like). It can be challenging to determine which cartographical features to display on a digital map, where to display such cartographical features and what type of information to include in these features.

SUMMARY

Some implementations relate generally to digital maps and, more particularly, to methods, systems and computer readable media for identifying local georeferenced data. Some implementations can include a method. In some implementations the method can include receiving, at one or more processors, a plurality of images and corresponding metadata for each image, the metadata including location information indicating where the corresponding image was acquired and object information indicating one or more objects shown in the corresponding image. The method can also include determining, with the one or more processors, based on the images and corresponding metadata, that a group of images within the plurality of images is associated with a given object at a given location. The method can further include updating a digital map, with the one or more processors, to include a cartographical feature based on the determination of the given object at the given location, wherein the cartographical feature is caused to be displayed on the digital map at a location corresponding to the given location and the cartographical feature can include one or more of an image from the group of images and a portion of the metadata from one or more of the images.

The digital map can be updated when the group of images includes a number of images above a threshold value. Determining that a group of the images are associated with a given object at a given location can include performing a data clustering technique on the images and corresponding metadata to determine that a location of each of the images in the group are within a distance threshold and to determine that the object information for each of the images indicates that the images in the group relate to a same object.

The method can also include determining a location of the feature based on a combination of the location information of the images in the group. The location information can include data obtained from a global positioning system receiver. The location information can include data obtained from a micro-location system. The object information can include one or more tags, where each tag includes one of text data or audio data.

The object information for one or more of the images can be generated automatically using an image analysis system and included in the metadata of a corresponding image. Each image of the plurality of images is received from a different user device.

Some implementations can include a system comprising one or more processors configured to perform operations. The operations can include receiving a plurality of images and corresponding metadata for each image, the metadata including location information indicating where the corresponding image was acquired and object information indicating one or more objects shown in the corresponding image. The operations can also include determining based on the images and corresponding metadata, that a group of images within the plurality of images is associated with a given object at a given location, wherein the group of images includes at least a threshold number of images. The operations can further include updating a digital map to include a cartographical feature based on the determination of the given object at the given location, wherein the cartographical feature is caused to be displayed on the digital map at a location corresponding to the given location and the cartographical feature can include one or more of an image from the group of images and a portion of the metadata from one or more of the images.

Determining that a group of the images are associated with a given object at a given location can include performing a data clustering technique on the images and corresponding metadata to determine that a location of each of the images in the group are within a distance threshold and to determine that the object information for each of the images indicates that the images in the group relate to a same object.

The operations can also include determining a location of the feature based on a combination of the location information of the images in the group. The location information can include data obtained from a global positioning system receiver. The object information can include one or more tags, where each tag includes one of text data or audio data. Each image of the plurality of images can be received from a different user device.

Some implementations can include a nontransitory computer readable medium having stored thereon software instructions that, when executed by one or more processors, cause the one or more processors to perform operations. The operations can include receiving a plurality of images and corresponding metadata for each image, the metadata including location information indicating where the corresponding image was acquired and object information indicating one or more objects shown in the corresponding image. The operations can also include determining based on the images and corresponding metadata, that a group of images within the plurality of images is associated with a given object at a given location, wherein the group of images includes at least a threshold number of images. The operations can further include updating a digital map to include a cartographical feature based on the determination of the given object at the given location, wherein the cartographical feature is caused to be displayed on the digital map at a location corresponding to the given location and the cartographical feature can include one or more of an image from the group of images and a portion of the metadata from one or more of the images.

Determining that a group of the images are associated with a given object at a given location can include performing a data clustering technique on the images and corresponding metadata to determine that a location of each of the images in the group are within a distance threshold and to determine that the object information for each of the images indicates that the images in the group relate to a same object. The operations can also include determining a location of the feature based on a combination of the location information of the images in the group.

The object information can include one or more tags, where each tag includes one of text data or audio data. Each image of the plurality of images can be received from a different user device.

In any of the above implementations, the cartographical feature can include a static cartographical feature. The static cartographical feature can include at least a portion of a single image of the group of images.

DETAILED DESCRIPTION

In general, some implementations provide systems, methods or computer readable media for identifying local georeferenced data. Some conventional digital maps may contain information about certain locations or objects (e.g., businesses) including address, operating hours, reviews, photos or the like. Other smaller objects of interest may not be displayed on a conventional digital map possibly due to a lack of fine-grained local georeferenced data.

Some implementations can include an ability to identify fine-grained local georeferenced information at a large scale. In some implementations, a gaming app can provide users with incentives to supply local georeferenced content (e.g., images and associated metadata). In cases where a system will be using image information from users, user authorization may be obtained for the system to analyze, use, and/or store images and any associated image information (e.g., metadata or automatically determined image information). This content can be automatically processed using clustering and proximity techniques to determine relevant and trustworthy fine-grained local features suitable for addition to a publicly available digital map. Relevance can be determined automatically using one or more factors such as when a photo was acquired relative to the present time, how a photo may relate to the surrounding area (e.g., a photo of an animal exhibit may be a relevant feature for a surrounding zoo map area), level of detail in an image (e.g., a photo of an animal exhibit at a zoo may be relevant, while a photo of a waterfall portion of the exhibit may not be as relevant to the zoo map portion), or the like. Trustworthiness of an image can be an indication of how reliable the image and other information about the image may be. The more trustworthy an image is determined to be, the more likely that the image can be used to generate a cartographical feature. Trustworthiness can be determined automatically using one or more factors, e.g., the smaller the region covered the more trustworthy the image may be, whether the image has been submitted by a user having verified user status, a past history of the user submitting the image (e.g., have the user's previous submissions been verified and/or accepted in the past), a time photo was taken relative to the present time, or the like.

Figure 1:
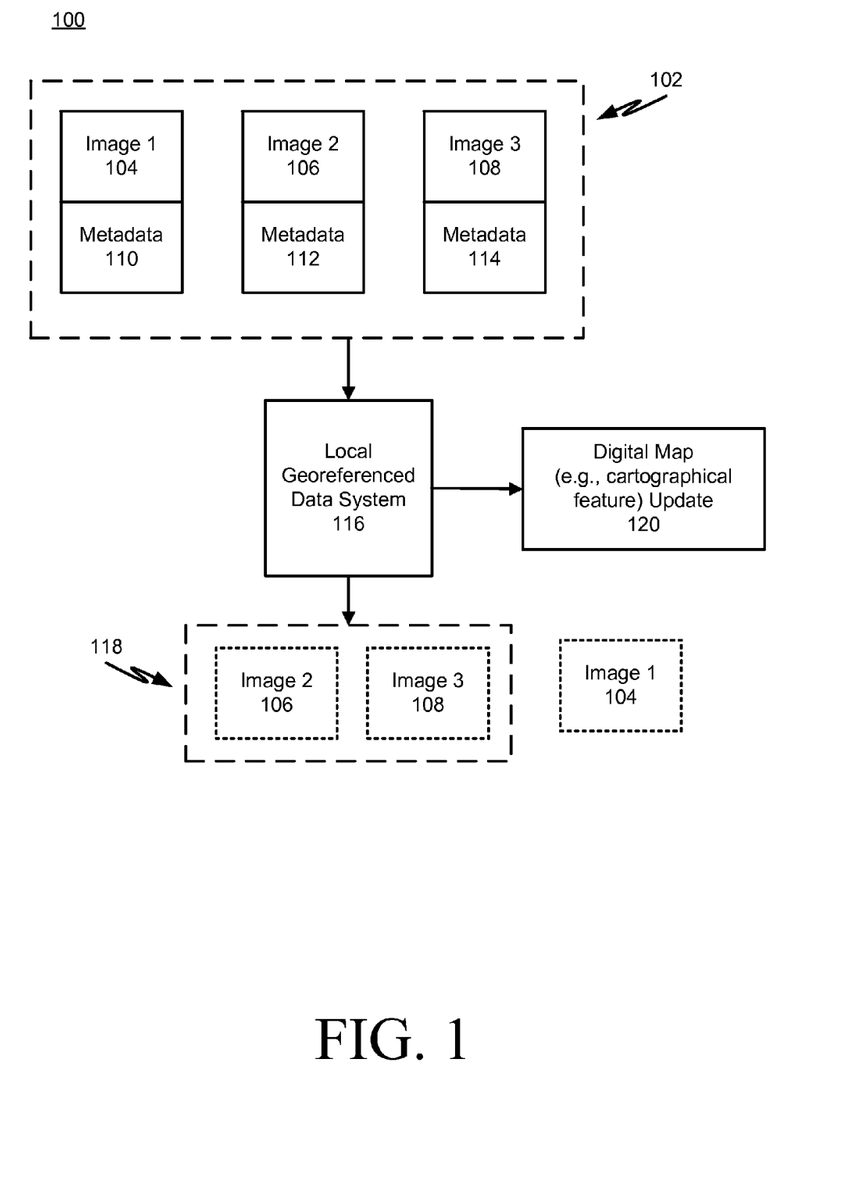
FIG. 1 is a diagram of an example local georeferenced data identification system in accordance with some implementations.

FIG. 1 is a diagram of an example local georeferenced data system environment 100 in accordance with some implementations. The environment 100 includes a plurality of images 102. Each of the images (104-108) includes respective metadata 110-114.

In operation, the images (104-108) and corresponding metadata (110-114) are supplied to a local georeferenced data system 116. The local georeferenced data system 116 processes the images (as described below in greater detail) to determine that a group of the images (e.g., group 118 including Image 2 106 and Image 3 108) relate to a given object at a given location, while one or more images (e.g., Image 1 104) may not relate to that given object and location. From the group of images 118 and corresponding metadata, the system 116 can generate a digital map feature update (e.g., cartographical feature) via the digital map feature update module 120 based on the local georeferenced data of the group of images 118. The digital map feature update provided by the digital map feature update module 120 can be displayed on a publicly or privately available digital map.

Figure 2:
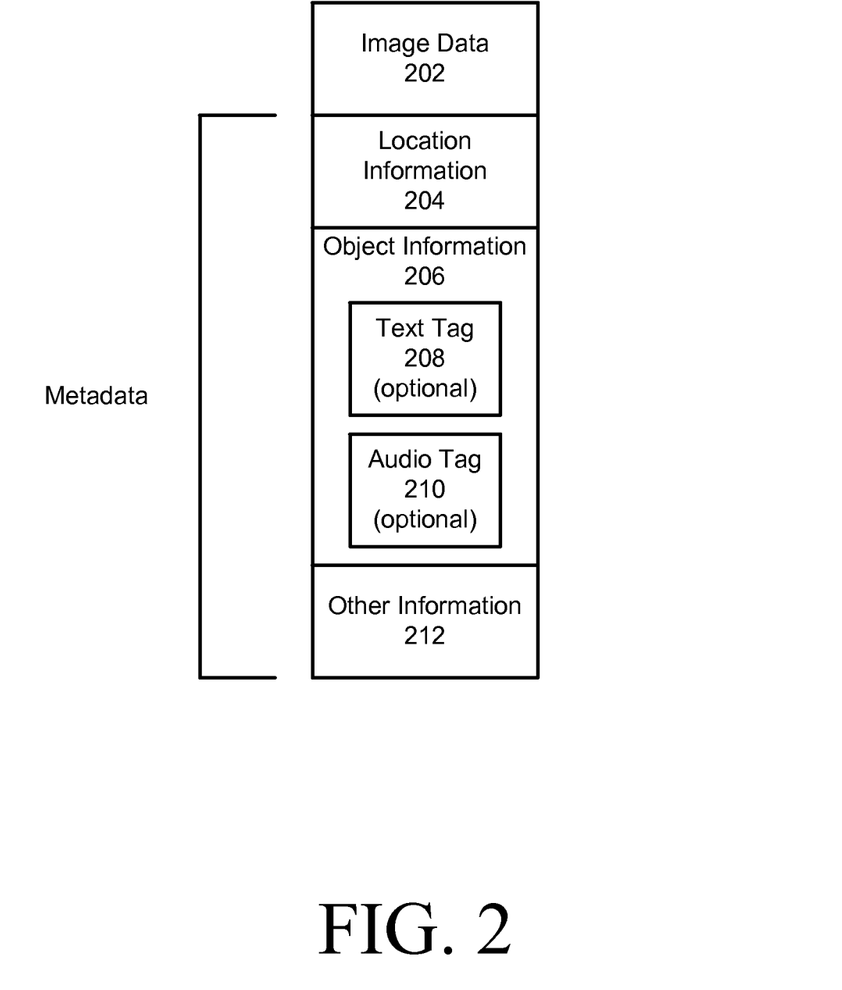
FIG. 2 is a diagram of example image data with corresponding metadata in accordance with some implementations.

FIG. 2 is a diagram of example image data with corresponding metadata (e.g., EXIF data) in accordance with some implementations. An image and metadata combination can include image data 202 in any suitable format, location information 204 (e.g., latitude/longitude or the like), object information 206, which can include one or more of an optional text tag 208 (e.g., "lion") or audio tag 210. The location information 204 can include information obtained from one or more of a global positioning system (GPS) receiver, a micro-location system (e.g., near field communications, RF ID, low power Bluetooth, beacon system or the like), a WiFi location system, a radio frequency location system or the like. In addition to the above, the metadata can include other information 212 such as date and time image was acquired, device that acquired the image or the like. Also, as mentioned above, information about the image can be automatically generated via image analysis (e.g., using machine object identification techniques to determine objects present in an image). Further, automatic inferences can be made based on objects and/or hierarchy of objects within a same geographic location. For example, images of an animal at a location within a zoo could be inferred to have been taken at the zoo exhibit for that type of animal. In cases where a system will be using image information from users (e.g., location, date/time, object identification, or the like), user authorization may be obtained for the system to analyze, use, and/or store images and any associated image information (e.g., metadata or automatically determined image information). In some implementations, the system can identify features in images using solely metadata, without actually receiving the images.

Figure 3:
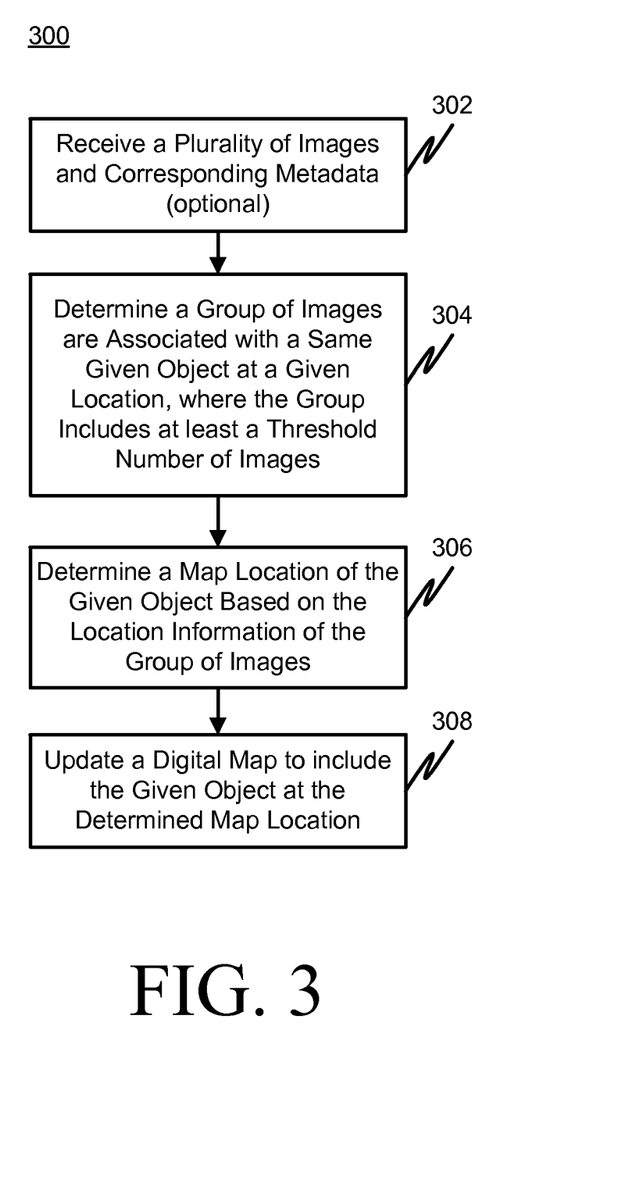
FIG. 3 is a flow chart of an example method for local georeferenced data identification in accordance with some implementations.

FIG. 3 is a flow chart of an example method for identifying local georeferenced data in accordance with some implementations. Processing begins at 302, where a plurality of images and corresponding metadata are optionally received. The plurality of images can be received as a group (e.g., from a photo collection) or individually over time (e.g., via crowdsourcing). Alternatively, the images could be identified from an image source (e.g., a collection of stored images, a stream of images being submitted to a social network service, or the like). Processing continues to 304.

At 304, it is determined that a group of images from within the plurality of images are associated with a given object at a given location (e.g., the lion exhibit at the zoo). The determination can include using a clustering process (e.g., one or more of connectivity based clustering (or hierarchical clustering), centroid-based clustering, k-means clustering, distribution-based clustering, density-based clustering, or other suitable process). The clustering process can also include a temporal analysis section that evaluates the length of time that images in the cluster have been taken. The temporal aspect can be used to automatically determine whether an object at a given location is transient or not and whether the feature should be added or not, as discussed below. Objects or features can include boundaries or regions where the objects are seen (e.g., a number of images may indicate a feature with a given boundary). In such cases, the object and the boundary or regions can be determined and used to in the cartographical feature generation described below.

Optionally, the determination that a group of images from within the plurality of images are associated with a given object at a given location can be made when the group of images includes at least a threshold number of images. The threshold can be a value used to indicate that a given number of different users have submitted an image showing the same or similar object(s) and thus, by virtue of the threshold number of images, a system can automatically determine that the object(s) are at the location with a certain degree of confidence. The threshold can be a manually set value or can be automatically determined. The threshold can be static or dynamic. For example, the threshold could be automatically determined and dynamically changed based on information such as user characteristics (e.g., verified vs. unverified), area of the region covered (larger region may require more photos), or the like. Processing continues to 306.

At 306, a map location of the given object is determined based on the location information of the group of images. The map location can be determined from a combination of the locations of the group of images (e.g., averaging, geometric center of the various location points, center of mass or the like). Also, a representative image from the group of images or a description from the metadata of one or more corresponding images can be selected for displaying with the detailed map feature. Processing continues to 308.

At 308, a digital map is optionally updated with a cartographical feature based on the given object (e.g., the cartographical feature or information can include all or a portion of one or more images, all or a portion of one or more videos, all or a portion of one or more audio files and/or text information or the like) at the determined map location. The type of information used in a cartographical feature representation on a map can be determined automatically based on what object is identified (e.g., a zoo may have a playful icon automatically selected, a food stand may have the logo for the food company automatically selected, or the like). The cartographical feature can include a static cartographical feature (e.g., a cartographical feature can have a static or relatively unchanging appearance) and/or a dynamic feature (e.g., a changing image, a moving video, a playing audio file or the like). The static cartographical feature can include at least a portion of a single image of the group of images (e.g., a single, unchanging image portion). In addition to, or as an alternative to, using image metadata for the cartographical feature and/or location, the location or cartographical information can be automatically generated based on one or more images. For example, automatically generating information about the photos can include analyzing images to generate additional data and then determining location, metadata or cartographical feature data based on the automatically generated data. If the cartographical feature includes a boundary or region as discussed above, the feature can be changed based on the boundary size (e.g., more or less of the information about the feature can be shown, the placement of the cartographical feature information can be adjusted based on the boundary or region, or the like). It will be appreciated that 302-308 can be repeated in whole or in part in order to accomplish a contemplated local georeferenced data identification process.

In some cases, a given location may contain multiple objects, particular at certain map scales (e.g., a map scale showing relatively large areas). In such instances, cartographical features can be presented as multiple features with lead lines from the feature to the location to avoid overlapping the images. Alternatively, the images could be overlapped in a way that indicates to a user that there are multiple features present (e.g., the feature images could be overlapping, but offset from each other to show the various features present). Also, a same geographic location can be associated with a hierarchy of objects (e.g., a zoo can have a pond, the pond can have different birds at different parts of pond). A hierarchy of cartographical features can be tied to a zoom level of a map to enable the features to be shown in accordance with the zoom level (e.g., larger features at more coarse zoom levels and finer details at more granular or "close up" zoom levels).

The process of identifying local georeferenced data can be repeated periodically (e.g., daily, weekly, monthly, yearly or the like) in order to keep the map up to date and adapting to features that may change. When objects different from a previous cartographical feature at a given location are identified at the given location at a more recent time, the previous cartographical feature for that location may be removed and replaced with a new feature showing the more recently identified objects. Also, objects that are somewhat transient may not be represented on a map. For example, a flash mob (temporary event) may cause a large number of images to be acquired and submitted at a particular time, however, the flash mob may not ever occur at that same location again. Thus, even though a threshold number of images is obtained at a given time, the lack of images of that object or event at other times may indicate that the object or event is transient and not necessarily suitable for display on a map. However, on the other hand, there may be maps tailored for such transient object or occurrences (e.g., a map of past flash mob performances or the like) and the indication of transient object or events may be used to cause a cartographical feature to be added to one of those types of maps.

Figure 4:
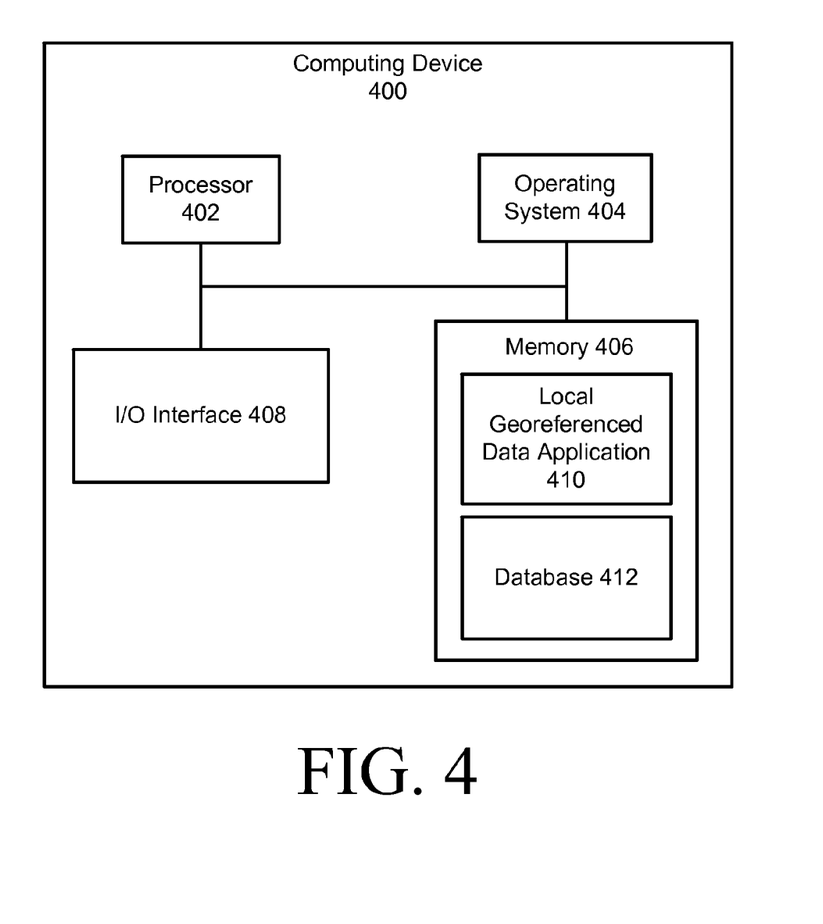
FIG. 4 is a diagram of a computer system for local georeferenced data identification in accordance with some implementations.

FIG. 4 is a diagram of an example computing device 400 (e.g., mobile device) that can be configured for identifying local georeferenced data in accordance with some implementations. The computing device 400 includes a processor 402, an operating system 404, a memory 406 and an I/O interface 408. The memory 406 can include a local georeferenced data identification application 410 (e.g., mobile application) and a database 412 (e.g., for storing local georeferenced data or the like).

In operation, the processor 402 may execute the local georeferenced data identification application 410 stored in the memory 406. The local georeferenced data identification application 410 can include software instructions that, when executed by the processor, cause the processor to perform operations for local georeferenced data identification in accordance with the present disclosure (e.g., the local georeferenced data identification application 410 can include one or more of steps 302-308 described above and, in conjunction, can access the database 412). The local georeferenced data identification application 410 can also operate in conjunction with the operating system 404.

The local georeferenced data computing device (e.g., 400) can include, but is not limited to, a single processor system, a multi-processor system (co-located or distributed), a cloud computing system, or a combination of the above.

Figure 5:
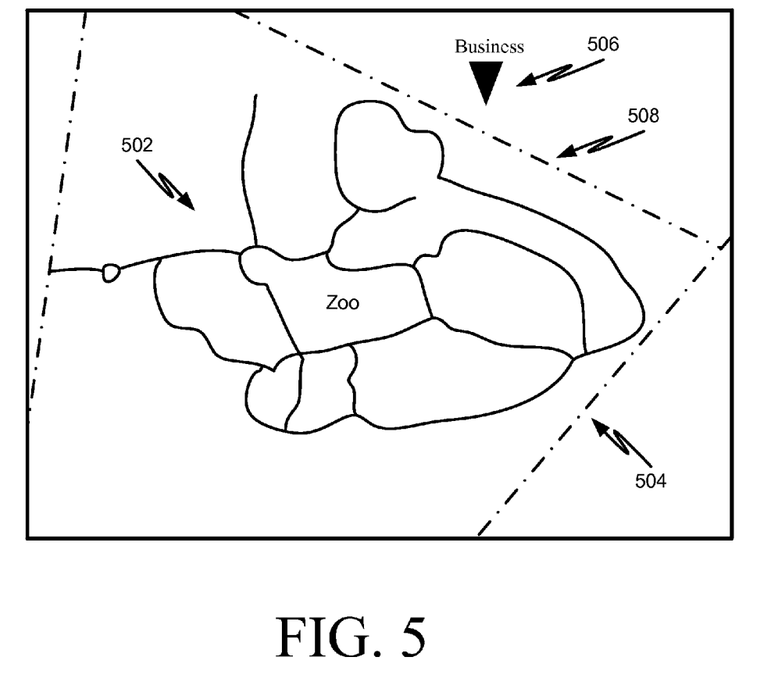
FIG. 5 is a diagram of an example digital map image without local georeferenced data.

FIG. 5 shows a simplified example digital map display of a zoo 502 before local georeferenced data has been added as described herein. The map of FIG. 5 shows a first road 504 and a business 506 on a second road 508. The map of the zoo 502 simply shows a large empty area surrounded by roads, with some internal trails. In contrast, paper maps provided to visitors by zoos may contain details including the locations of animals, shops, food stands, and restrooms.

Figure 6:
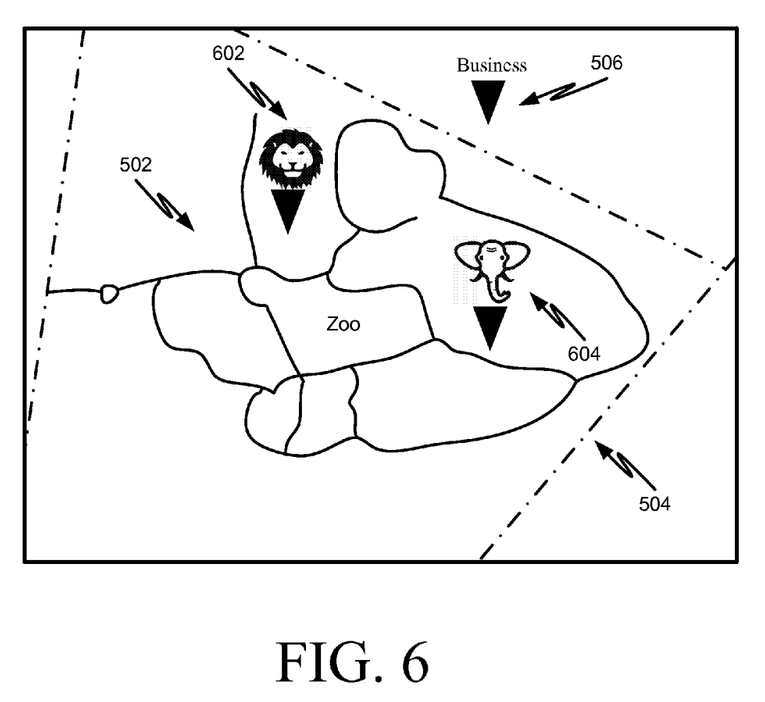
FIG. 6 is a diagram of an example digital map image with local georeferenced data in accordance with some implementations.

FIG. 6 shows a simplified example digital map having fine-grained local georeferenced data features as may be provided by an implementation of the subject matter disclosed herein. In addition to the features shown in FIG. 5, FIG. 6 shows a location of a lion exhibit 602 and an elephant exhibit 604 at the zoo. These fine-grained map details are similar to those that are shown on zoo and park maps provided to visitors. Thus, using a local georeferenced data system or method as described herein, digital map users may be provided with details based on the local georeferenced data identification carried out on a large scale (e.g., via crowd sourcing or analysis of photograph collections).

In some implementations, once a sufficient degree of confidence is determined (e.g., a threshold number of images is received about a given object), the local georeferenced data can be provided in various ways. For example, the data can be provided within an app (e.g., a treasure hunt app as described herein) in order to provide users with automatically-generated treasure maps even though no maps may have been explicitly shared with the user by other users. The local georeferenced data can be provided in a digital map to provide an increased level of detail about locations associated with the fine-grained digital map features added based on the acquired local georeferenced data.

Figure 7:
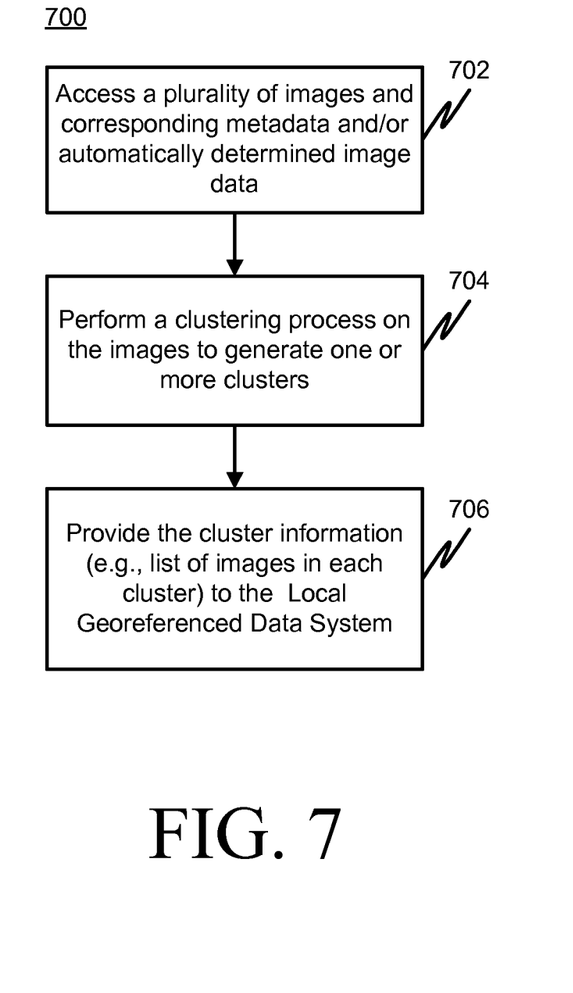
FIG. 7 is a flow chart of an example method for clustering images in accordance with some implementations.

FIG. 7 shows an example method 700 for determining image (or image group) location using clustering techniques. Processing begins at 702, where a plurality of images and corresponding metadata and/or automatically determined image data are accessed (e.g., received, obtained, or the like). Processing continues to 704.

At 704, a clustering process is performed on the images to generate one or more clusters. The clustering process can include one or more of connectivity based clustering (or hierarchical clustering), centroid-based clustering, k-means clustering, distribution-based clustering, density-based clustering, or other suitable clustering processes. In general, a clustering process seeks to automatically group images into one or more clusters based on an aspect or feature of the images (e.g., location, object(s) in image, time/date, or the like). Typically for the present local georeferenced data application, location may be a common feature analyzed by the clustering process. Processing continues to 706.

At 706, the cluster information (e.g., list of images in each cluster and/or a clustering value such as a location based on the cluster) can be provided to another system or module (e.g., provided to the Local Georeferenced Data System).

There are various ways to obtain the images and associated metadata for use as input to the local georeferenced data identification systems described herein. For example, in some implementations the local georeferenced data can be determined through crowdsourcing by giving users an incentive to provide data (e.g., the treasure hunt app described herein). In some implementations, collections of photographs can be processed to identify local georeferenced data where the photographs include location metadata (e.g., EXIF data including the location the photograph was taken at). Some implementations can make use of georeferenced pictures of interesting things submitted by players of an augmented reality massively multiplayer online role playing GPS-dependent game or the like. Some implementations can use data supplied to or from a location information service that provides information to users based on the location of their device. Local georeferenced data can be determined (automatically, manually or a combination of the two) from location images (e.g., street view map images or the like). Local georeferenced data may also be obtained from georeferenced entries in a knowledge graph (or similar structure) associated with a search engine or the like. In cases where a system will be using image information from users (e.g., location, date/time, object identification, or the like), user authorization may be obtained for the system to analyze, use, and/or store images and any associated image information (e.g., metadata or automatically determined image information).

In some implementations, a large store of photographs with titles (e.g., public photos in a photo sharing site) can be processed to determine those that have location data (e.g., in the embedded EXIF). The photographs with location data can be supplied to a local georeferenced data identification system, which can perform a clustering process to detect similarities in the subjects and locations of the photographs.

Figure 8:
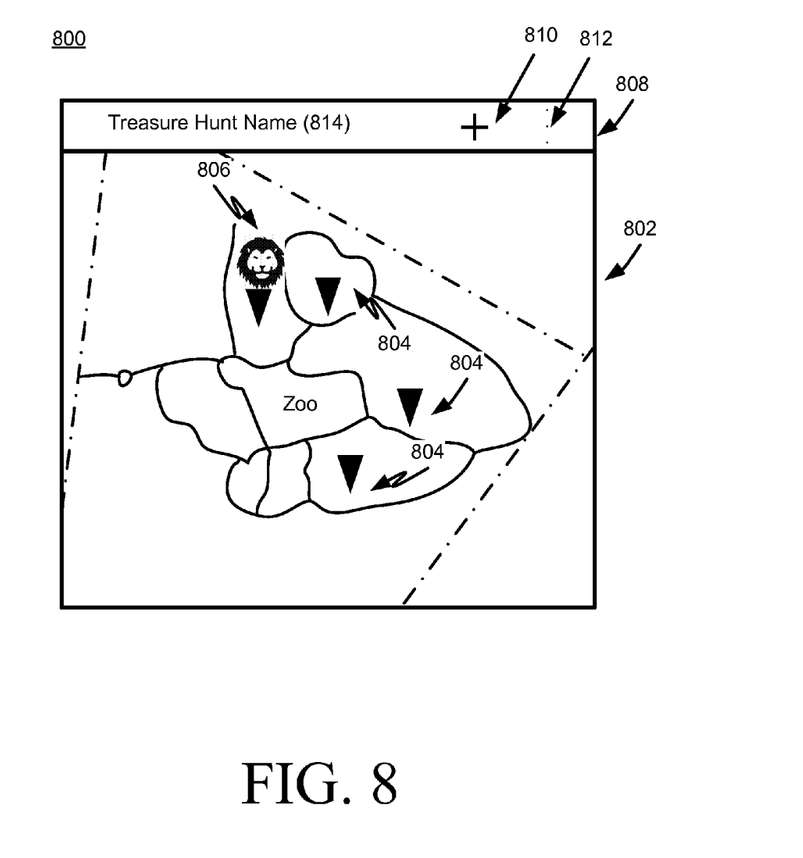
FIG. 8 is a diagram of an example local georeferenced data game user interface in accordance with some implementations.

In some implementations, a system for incentivizing users to submit local georeferenced data can include a mobile application (or "app") game (e.g., a "treasure hunt" game). An example user interface 800 of a treasure hunt game is shown in FIG. 8. The treasure hunt game can be a mobile app with two distinct goals. The first goal can be to provide users with a fun and educational experience involving maps. The treasure hunt app can help encourage users to get out into the physical world, while using digital devices to enhance their outdoor experiences instead of replacing them. The treasure hunt game can also give users opportunities to learn about subjects (e.g., science, history, and geography) in contexts where this learning makes sense. The treasure hunt app can permit users to take part on a simple game activity, but can also make it possible to enrich an experience with problem solving activities and allow access to knowledge through a more structured activity. The game app can also provide a communication channel between users (e.g., one player defines a treasure to be found by someone else, and when it is found the user can send this event back to another user, even if they are not playing the game at the same time).

A second goal of the incentivizing mobile app is to build a fine-grained database of things that can be found in public spaces (e.g., statues, plants, monuments, graffiti, or any kind of object that people may find worth capturing). This database of fine-grained local georeferenced data can be supplied to a detailed feature mapping system as described above in order to add small georeferenced objects to a digital map, for example.

The treasure hunt mobile game app mentioned above can have two modes of operation. In a first mode, users can create maps using their mobile devices by finding and photographing interesting things. Then, in a second mode, users can play various "scavenger hunt"-type games using these maps.

A treasure hunt map can include a collection of markers (804) on a digital map (802). Each marker can represent a single "real world" object. A user can have any number of different maps. Each map can have a name. Users can add an object to a map by taking a picture of the object. Each object can have at least one photo associated with it, and, optionally, additional information about the object.

Within the treasure hunt app, touching (or activating) a marker on the displayed map shows a popup information (806) window that can include a thumbnail of the object's main photo and its title. The map creator can provide a picture to be granted as a badge for players who complete the map.

The treasure hunt screen can include a map or aerial image. Each marker on the map shows an item that has already been created in this map. By selecting a user interface element (e.g., by tapping a "+" symbol (810) on the title bar 808) the device's camera app is opened and a new photo can be taken and associated with a new marker on the map. Tapping a marker (804) shows an info window with the item's name and photo. The user interface screen 800 also includes an options user interface element 812 and a treasure hunt map title 814. When the options user interface element 812 is selected, a list of one or more options can be displayed.

An object's location can be determined by the device's location sensors (e.g., GPS, micro-location, WiFi location system or the like). Some implementations may have a minimum location accuracy (e.g., 10 m) before a photo is taken. If the sensors' accuracy worsens (or degrades) to a value over the minimum acceptable (e.g., 10 m) while the user is taking the photo, the photo can be rejected and the object may not be added to the map.

In some implementations, the user can manually correct for sensor inaccuracies by "longpressing" a marker and dragging it to a position within the acceptable limits (e.g., no more than 10 m away). Touching the info window of a marker can bring up an editor where the user can enter information (e.g., the object's title or a hint). The hint can be a small text string that may be used in some modes of game play during hunts. Both title and hint are optional. The user can add additional photos to an object. Deleting an item also deletes all of its photos.

The user can see maps that have been shared with the user. Users can also transfer maps between devices if both devices support an inter-device transfer protocol (e.g., near field communications or NFC). Public maps may be checked for abuse before being eligible for display.

To engage in a "treasure hunt" a user selects a map to play on from a set of maps. The set of maps can include one or more of: the user's own maps, maps shared with the user, or public maps. A sublist of maps within each of the above-mentioned types can be displayed. Each sublist can be ordered according to the distance from the user's current location to the center of each map's bounding box, in ascending order. Maps that do not belong to the user and that are farther away than a certain threshold should not appear on the list. The app may also permit a user to see all maps, not just those that are nearby.

The user interface to pick a map can include a map, with markers for each hunt and clustering of markers of a given density at a high zoom level. When a hunt is selected, details about it should be shown to the user (e.g., the bounds that a hunt cover so that a user can know where and how much we are going to have to walk to play it).

During treasure hunt game play, an arrow can be displayed that uses the internal compass of the device to point towards the nearest item. A number can be displayed over (or near) the arrow to indicate the distance (e.g., in meters or other units) to the nearest item. The map can include "treasure chests", which are custom map markers indicating where items have been found. Symbology (e.g., a trail symbol) can be displayed showing where the user has already been during the hunt. The trail's color can indicate the distance to items (e.g., red can indicate an item is near, and blue can indicate that there are no items nearby. In some implementations, when a user's distance measuring device (e.g., GPS) shows that the user has come within a predetermined fixed distance of an item, a sound plays and the user sees the item's name and picture displayed. At that moment, a marker is added to the map. When all items on a map are found, a victory sound plays and a congratulatory message and a summary of the hunt can be displayed for viewing by the user.

An example treasure hunt game can include 5 levels of difficulty. The difference between levels is the amount of assistance given to the player. The levels can include:

Level 1 in which a simple arrow points towards nearest item and a distance to the item is displayed.

Level 2 in which the user device must be physically rotated so that an onscreen compass is pointing north and a second arrow then points towards the nearest item with a distance to the item displayed.

Level 3 in which a map shows a marker at the location of the nearest treasure and no other assistance is given.

Level 4 in which only the distance to the nearest target is displayed. The user may be required to triangulate to discover bearing.

Level 5 in which a "heat sensor" changes a color of a compass according to distance from treasure.

In some implementations, users can add comments to items. Comments may be moderated by one or more users. If an item has no title, users can add their own title. Only the user who added the title can see the title at first. The map creator can be notified of the suggested title and can choose to accept it as the actual title, at which point all users of the map can see it.

The treasure hunt app can include a multiplayer mode. To use multiplayer modes, the accounts of all players may be required to be registered with the same service (e.g., a same social network). In an example implementation, there can be three multiplayer modes—two are cooperative, and one is competitive.

In a first cooperative mode, all players have to complete the same map. Players may travel in different directions. Each time a player finds an item, the other players are notified. Each player's map shows all the items that the team has found.

In a second cooperative multiplayer mode, up to three players can play, each player playing a different role. The "navigator" has the directional aid (compass) that points towards the next item. The "mapper" has the map and is responsible for steering the team around obstacles and for picking the best path towards the treasure. The "photographer" is responsible for taking photos of items found and adding additional data. If only two players are available, the role of photographer is shared between the two.

In a competitive mode, players can play on the same map or on different maps that are in the same region. Each player follows his map independently. When a player finds an item, other players are notified, but the item's location is not disclosed to the other players. When a player completes his map, the other players are notified.

The treasure hunt app or other mapping game can give incentives to map creators, which can in turn attract more players and build engagement with the tool. The game can award "badges" for various accomplishments such as map creation (e.g., 1, 5, 10, 50 maps created) and map usage (e.g., 1, 5, 10, 100, 1000 users have played on a user's maps) for map creators. For players, the system can award badges for items found (e.g., 1, 10, 100, 1000 items found), maps completed (e.g., 1, 5, 10, 50 maps completed).

The treasure hunt system can also provide leaderboards. There can be separate leaderboards for creators and for players.

Players may start at Level 1 and "level up" or move up in level when they complete a given number of maps. Leveling up can causes the default difficulty level of games to increase. Players can opt to play at any difficulty level, but will only receive points that count towards the leaderboards when they play at or above their current level.

Map creators can receive app notifications when other players complete maps that they created. For security reasons, notifications may only be issued hours after the players have finished a map. Notifications do not identify the players.

Publicly accessible maps may be screened for "spam" and abuse before being eligible to be used by other players. This screening can cover item photos, titles, or hints. Screening can combine automatic detection and manual review. When viewing maps, a user can be permitted to block all maps from an author. If an author is blocked, his maps should no longer appear in map selection lists. Users can be permitted to flag maps as inappropriate. Flagged maps will no longer appear to other users. The owners of flagged maps may appeal, in which case the map will go to manual review and may be restored if found not to contain objectionable content.

In order to attract players to treasure hunt initially, the system can be seeded with public maps. Public maps can be automatically generated from user data by looking for items that are in the maps of different users, but that are in the same geographic location. For example, if many users add the same statue to their maps, the system can determine, as described above, that it is safe to add the statue to a publicly available map. To determine whether two items refer to the same real world entity, we can use both geographic proximity and string similarity of the titles.

The client (or user) device(s) can include, but are not limited to, a desktop computer, a laptop computer, a portable computer, a tablet computing device, a smartphone, a feature phone, a personal digital assistant, a media player, televisions, an electronic book reader, an entertainment system of a vehicle or the like. Also, client/user devices can include wearable computing devices (e.g., glasses, watches or the like), furniture mounted computing devices or building mounted computing devices.

All or a portion of an identifying local georeferenced data operation can be performed on a client/server system. For example, a user device (e.g., client) can include a wireless mobile device and can be configured to communicate with a server or other external system. The server can be configured to perform one or more of steps 302-308, with the user interface being displayed on the user device. The acquired local georeferenced data may be stored on a server, a cloud storage system, locally on a user device or on a combination of the above. Some implementations can include identifying local georeferenced data via a website running on a web browser or via a mobile application running on a mobile computing device.

The user devices can be connected to the server via a network. The network connecting user devices to the server can be a wired or wireless network, and can include, but is not limited to, a WiFi network, a local area network, a wide area network, the Internet, or a combination of the above. Some implementations can include some operations being performed on two or more computing devices (e.g., two or more of the user device types mentioned above or the like). Some implementations can include all operations being performed on the same device (e.g., one of the user device types mentioned above or the like).

The data storage, memory or computer readable medium can be a nontransitory medium e.g., a magnetic storage device (hard disk drive or the like), optical storage device (CD, DVD or the like), or electronic storage device (RAM, ROM, flash, or the like). The software instructions can also be contained in, and provided as, an electronic signal, for example in the form of software as a service (SaaS) delivered from a server (e.g., a distributed system or a cloud computing system).

In situations in which the systems discussed here may process personal information about users, or may make use of personal information, the users may be provided with an opportunity to control whether programs or features may process user information (e.g., a user's current location). In addition, certain data may be treated in one or more ways before it is stored or used, so that personally identifiable information is removed. For example, a user's identity may be treated so that no personally identifiable information can be determined from provided content, so that a particular location of a user cannot be determined. Thus, the user may have control over how information about the user may be used by a local georeferenced data identification system.

Some implementations of the disclosed method, system, and computer readable media can be implemented in computer or electronic hardware, software (e.g., as a computer program product or nontransitory computer readable media having stored instructions for identifying local georeferenced data as described herein), or a combination of the above. The stored software instructions can be executed on a programmed general purpose computer, a special purpose computer, a microprocessor, or the like.

It is, therefore, apparent that there is provided, in accordance with the various example implementations disclosed herein, systems, methods and computer readable media for identifying local georeferenced data.

While the disclosed subject matter has been described in conjunction with a number of implementations, it is evident that many alternatives, modifications and variations would be or are apparent to those of ordinary skill in the applicable arts. Accordingly, Applicants intend to embrace all such alternatives, modifications, equivalents and variations that are within the spirit and scope of the disclosed subject matter.

What is claimed is:

1. A computerized method comprising:
   receiving, at one or more processors, a plurality of images and corresponding metadata for each image, the metadata including location information indicating where the corresponding image was acquired and object information indicating one or more objects shown in the corresponding image;
   determining, with the one or more processors, based on the images and the corresponding metadata, that a group of images within the plurality of images is associated with a given object at a given location, wherein the group of images includes at least a threshold number of images that are each taken by at least a threshold number of different users; and updating a digital map, with the one or more processors, to include a cartographical feature based on the determination of the given object at the given location, wherein the cartographical feature is caused to be displayed on the digital map at a location corresponding to the given location and the cartographical feature includes one or more of an image from the group of images and a portion of the metadata from one or more of the images.

2. The method of claim 1, wherein the determining that a group of the images are associated with a given object at a given location includes performing a data clustering technique on the images and corresponding metadata to determine that a location of each of the images in the group are within a distance threshold and to determine that the object information for each of the images indicates that the images in the group relate to a same object.

3. The method of claim 2, wherein performing the data clustering technique includes evaluating a length of time over which the group of images were taken.

4. The method of claim 1, further comprising determining a location of the feature based on a combination of the location information of the images in the group.

5. The method of claim 1, wherein the location information includes data obtained from a global positioning system receiver.

6. The method of claim 1, wherein the location information includes data obtained from a micro-location system.

7. The method of claim 1, wherein the object information includes one or more tags, where each tag includes one of text data or audio data.

8. The method of claim 1, wherein the object information for one or more of the images is generated automatically using an image analysis system and included in the metadata of a corresponding image.

9. The method of claim 1, wherein the cartographical feature includes a static cartographical feature.

10. The method of claim 9, wherein the static cartographical feature includes at least a portion of a single image of the group of images.

11. The method of claim 1, wherein a type of information used in the cartographical feature is based on the given object.

12. A system comprising one or more processors configured to perform operations including:

receiving a plurality of images and corresponding metadata for each image, the metadata including location information indicating where the corresponding image was acquired and object information indicating one or more objects shown in the corresponding image;

determining based on the images and the corresponding metadata, that a group of images within the plurality of images is associated with a given object at a given location, wherein the group of images includes at least a threshold number of images that are each taken by at least a threshold number of different users; and updating a digital map to include a cartographical feature based on the determination of the given object at the given location, wherein the cartographical feature is caused to be displayed on the digital map at a location corresponding to the given location and the cartographical feature includes one or more of an image from the group of images and a portion of the metadata from one or more of the images.

13. The system of claim 12, wherein the determining that a group of the images are associated with a given object at a given location includes performing a data clustering technique on the images and corresponding metadata to determine that a location of each of the images in the group are within a distance threshold and to determine that the object information for each of the images indicates that the images in the group relate to a same object.

14. The system of claim 12, wherein the operations further comprise determining a location of the feature based on a combination of the location information of the images in the group.

15. The system of claim 12, wherein the location information includes data obtained from a global positioning system receiver.

16. The system of claim 12, wherein the object information includes one or more tags, where each tag includes one of text data or audio data.

17. The system of claim 12, wherein a type of information used in the cartographical feature is based on the given object.

18. A nontransitory computer readable medium having stored thereon software instructions that, when executed by one or more processors, cause the one or more processors to perform operations including:

receiving a plurality of images and corresponding metadata for each image, the metadata including location information indicating where the corresponding image was acquired and object information indicating one or more objects shown in the corresponding image;

determining based on the images and the corresponding metadata, that a first group of images within the plurality of images is associated with a first given object at a given location and that a second group of images within the plurality of images is associated with a second given object at the given location, wherein the group of images includes at least a threshold number of images taken by at least a threshold number of different users; and updating a digital map to include at least two cartographical features based on the determination of the first given object and the second given object at the given location, wherein a first cartographical feature is caused to be displayed on the digital map at a location corresponding to the given location for a first zoom level and the second cartographical feature is caused to be displayed on the digital map at the location corresponding to the given location for a second zoom level different from the first zoom level, and the first cartographical feature and the second cartographical feature include one or more of an image from the group of images and a portion of the metadata from one or more of the images.

19. The nontransitory computer readable medium of claim 18, wherein the determining that a first group of the images are associated with a first given object at a given location and a second group of the images are associated with the second given object at the given location includes performing a data clustering technique on the plurality of images and corresponding metadata to determine that a location of each of the images in the group are within a distance threshold.

20. The nontransitory computer readable medium of claim 18, further comprising determining a location of the first feature and the second feature based on a combination of the location information of the images in the group.

21. The nontransitory computer readable medium of claim 18, wherein the object information includes one or more tags, where each tag includes one of text data or audio data.

22. The nontransitory computer readable medium of claim 18, wherein each of the threshold number of images is taken by a different user of a plurality of users.

\* \* \* \* \*